(12) United States Patent
Asai

(10) Patent No.: US 9,621,100 B2
(45) Date of Patent: Apr. 11, 2017

(54) VEHICULAR AC ELECTRIC GENERATOR

(71) Applicant: Takamasa Asai, Tokyo (JP)

(72) Inventor: Takamasa Asai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 91 days.

(21) Appl. No.: 14/418,281

(22) PCT Filed: Nov. 22, 2012

(86) PCT No.: PCT/JP2012/080266
§ 371 (c)(1),
(2) Date: Jan. 29, 2015

(87) PCT Pub. No.: WO2014/080486
PCT Pub. Date: May 30, 2014

(65) Prior Publication Data
US 2015/0188479 A1    Jul. 2, 2015

(51) Int. Cl.
*H02K 5/00* (2006.01)
*H02P 25/22* (2006.01)
(Continued)

(52) U.S. Cl.
CPC ............ *H02P 25/22* (2013.01); *H02P 6/14* (2013.01); *H02P 9/48* (2013.01); *H02P 29/68* (2016.02); *H02P 2101/45* (2015.01)

(58) Field of Classification Search
USPC .......... 318/400.13, 599, 400.17, 400.26, 801
See application file for complete search history.

(56) References Cited

U.S. PATENT DOCUMENTS 5,708,352 A * 1/1998 Umeda ................... B60L 11/02
                                                    257/E29.104
7,791,308 B2 * 9/2010 Kitabatake ............. H01L 23/62
                                                    257/341
(Continued)

FOREIGN PATENT DOCUMENTS

JP    2005-039932 A    2/2005
JP    2005-506028 A    2/2005
(Continued)

OTHER PUBLICATIONS ("STripFET(TM) II Power MOSFET Order codes Part number Marking Package Packaging STN3NF06 N3NF06 SOT-223 Tape & reel", Feb. 28, 2007 (Feb. 28, 2007), XP055273315, Retrieved from the internet: URL:httpJ/www,st.com/st-web-ui/static/acvive/jp/resource/technical/document/datasheet/CD00002626.pdf) [Retrieved on May 18, 2016].*

(Continued)

*Primary Examiner* — Jorge L Carrasquillo
(74) *Attorney, Agent, or Firm* — Sughrue Mion, PLLC; Richard C. Turner

(57) ABSTRACT

To provide a vehicular AC electric generator provided with a highly reliable electric power conversion unit. A stator of a rotary electric machine is configured to have a plurality of sets of three-phase windings, an electric power conversion unit is configured to have a plurality of sets of three-phase bridge circuits corresponding to the plurality of sets of three-phase windings, each of the three-phase windings of the stator is connected to a DC power supply via the corresponding three-phase bridge circuits of the electric power conversion unit, the plurality of sets of three-phase bridge circuits are controlled to be at different switching timings from each other, and semiconductor switches constituting respective arms in the plurality of sets of three- (Continued)

phase bridge circuits are configured to be one-chip MOSFETs.

5 Claims, 6 Drawing Sheets

(51) Int. Cl.
*H02P 6/14* (2016.01)
*H02P 9/48* (2006.01)
*H02P 101/45* (2016.01)
*H02P 29/68* (2016.01)

(56) References Cited

U.S. PATENT DOCUMENTS

| | | | |
|---|---|---|---|
| 8,513,924 B2* | 8/2013 | Horihata | H02P 9/30 322/20 |
| 2005/0017694 A1 | 1/2005 | Masson et al. | |
| 2007/0241699 A1* | 10/2007 | Osada | H02P 5/74 318/141 |
| 2011/0006710 A1* | 1/2011 | Kondo | H02P 6/14 318/400.03 |
| 2011/0204856 A1* | 8/2011 | Horihata | H02P 9/30 322/27 |
| 2011/0215773 A1* | 9/2011 | Iwai | H02P 9/48 322/28 |

FOREIGN PATENT DOCUMENTS

| | | |
|---|---|---|
| JP | 2008-228399 A | 9/2008 |
| JP | 2012-033714 A | 2/2012 |

OTHER PUBLICATIONS

Communication dated Jul. 22, 2015 from the Japanese Patent Office in counterpart application No. 2014-548384.
International Search Report for PCT/JP2012/080266 dated Feb. 26, 2013.
"STripFET (TM) II Power MOSFET Order codes Part number Marking Package Packaging STN3NF06 N3NF06 SOT-223 Tape & reel", Feb. 28, 2007 (Feb. 28, 2007), XP055273315, Retrieved from the Internet: URL: http://www.st.com/st-web-ui/static/active/jp/resource/technical/document/datasheet/CD00002626.pdf [retrieved on May 18, 2016]; 12 pgs. total.
Communication, dated May 30, 2016, from the European Patent Office in counterpart European application No. 12888735.3.
Communication dated Aug. 31, 2016, from the State Intellectual Property Office of People's Republic of China in counterpart Application No. 201280077213.3.

* cited by examiner

VEHICULAR AC ELECTRIC GENERATOR

CROSS REFERENCE TO RELATED APPLICATIONS

This application is a National Stage of International Application No. PCT/JP2012/080266 filed Nov. 22, 2012, the contents of all of which are incorporated herein by reference in their entirety.

TECHNICAL FIELD

The present invention relates to a vehicular AC electric generator that converts DC power from a vehicle battery or the like to three-phase AC power so as to drive a rotary electric machine or converts three-phase AC power which is generated by the rotary electric machine to DC power to be supplied to a DC power supply such as the vehicle battery.

BACKGROUND ART

An example of car engine starter-cum-electric power generators of the related art is disclosed in PTL 1. A three-phase winding (stator) of a rotary electric machine is connected in a triangular shape, and a three-phase bridge circuit that is configured to have power semiconductor switches (power MOSFETs) is connected to the three-phase winding. Each of the power semiconductor switches is controlled to be ON and OFF at predetermined timing by a control circuit, converts DC power of a battery to AC power so that a three-phase AC current flows in the stator when operated as an electric motor, such as during car engine start, and is driven to rotate by the engine and rectifies a three-phase AC current induced in the stator for conversion into a DC current and supply to the battery when operated as an electric power generator.

In this example, a drive circuit that controls a field winding (rotor) and a current amount thereof is also provided, and an output torque as the electric motor and an electric power generation amount as the electric power generator can be variable when a field winding current amount is adjusted. In PTL 1, an avalanche effect of each of the power semiconductor switches is used as means for suppressing an excess voltage during load dump such as battery terminal disconnection in an electric power generation operation, and a rated voltage thereof is set as a value required for excess voltage suppression. This is because device size and costs increase when a Zener diode is used between DC terminals of the electric power conversion unit.

CITATION LIST

Patent Literature

PTL 1: JP-T-2005-506028

SUMMARY OF INVENTION

Technical Problem

In a case where the electric power conversion unit is used to be operated as the electric motor, a surge voltage is generated due to a wiring parasitic inductance at both ends of the main terminal at a turn-off timing of each of the power semiconductor switches. However, the surge energy can also be absorbed by the power semiconductor itself by using the avalanche effect of the power semiconductor switch.

The number of parallel connections of the power semiconductor switches in the respective arms of the three-phase bridge circuit is determined by a value of the current flowing therein and an allowable temperature rise value in electric power loss. In AC electric generators that are used for car engine start, however, a current with a maximum value of over 500 A flows and thus a plurality of the power semiconductor switches are used in parallel connection (for example, four-parallel) in most cases. In a case where those with different avalanche breakdown characteristics are connected in parallel, a turn-off loss distribution ratio changes according to the characteristic difference. In extreme cases, 100% of the switching loss is concentrated on the single power semiconductor switch with the lowest avalanche breakdown voltage, and overheating destruction may occur in this case. If the electric power losses in the respective semiconductor switches in parallel connection are not uniform, thermal design may have to be performed according to the semiconductor switch with the highest electric power loss. Accordingly, the total area of the semiconductor switches increases, a heat dissipation circuit of an electric power conversion device has to be larger in size, or product costs increase.

Problems and details of the related art described above will be described with reference to FIGS. 5 to 8. FIG. 5 is a configuration diagram illustrating a vehicular AC electric generator of the related art that uses a rotary electric machine and an electric power conversion unit. In a system that is illustrated in FIG. 5, DC power of a battery 17 is converted to three-phase AC power by an electric power conversion device 11 so that a rotary electric machine 19 is driven and a rotational force is given to an engine (not illustrated) or three-phase AC power that is generated by the rotary electric machine 19 which is driven by rotation of the engine is converted to DC power by the electric power conversion device 11 to be supplied to the battery 17 and a vehicle load (not illustrated).

A positive terminal of the battery 17 is connected to a high potential side DC terminal B of an electric power conversion unit 12, and a negative terminal of the battery 17 is connected to a low potential side DC terminal E of the electric power conversion unit 12. U-phase, V-phase, and W-phase stator windings of the rotary electric machine 19 are connected to three-phase AC terminals U, V, and W of the electric power conversion unit 12, respectively. A wiring inductance 18 represents the sum of parasitic inductance of high potential side and low potential side wiring connecting the battery 17 to the electric power conversion unit 12.

The electric power conversion unit 12 is configured to be of so-called three-phase bridge type with N channel-type power MOSFETs 16a to 16f, two-series and three-parallel, as semiconductor switches. Both ends of the two series are connected to the DC terminals B and E of the electric power conversion device 11 and a middle point of the two series is connected to the AC terminals U, V, and W in the electric power conversion unit 12. As illustrated in FIG. 7, the power MOSFETs 16a to 16f are a plurality of (four in this example) power MOSFETs connected in parallel according to a value of the current flowing in the stator of the rotary electric machine 19, have a first main terminal (drain D), a second main terminal (source S), and a control terminal (gate G), and are turned ON or OFF when voltage between the gate and the source is controlled by a control circuit 13. The power MOSFETs 16a to 16f are resistance elements allowing bidirectional energization between the drain and the source when ON and are diode elements allowing only energization from the source to the drain when OFF.

A small-capacity capacitor 15 is connected to the DC terminals B and E of the electric power conversion device 11 so that a high-frequency noise attributable to switching of the power MOSFETs 16a to 16f and the like is reduced and a radiation noise such as a radio noise and a conduction noise are suppressed. In general, a large-capacity capacitor is connected to a position of the capacitor 15 so as to smooth voltage between the DC terminals B and E in a case where the electric power conversion unit 12 performs electric power conversion in pulse width modulation (PWM) control. However, herein, the electric power conversion is performed by a one-pulse energization method (described later), and thus a large-capacity smoothing capacitor is not essential and is not mounted in the interest of product size reduction and cost reduction.

The control circuit 13 controls an output torque as the electric motor and an electric power generation amount as the electric power generator by performing ON-OFF driving of the power MOSFETs 16a to 16f of the electric power conversion unit 12 according to an operation mode, based on various types of sensor information such as a command from a higher ECU (not illustrated), the voltage between the DC terminals B and E, and a field winding current and a rotation position of the rotor (not illustrated) of the rotary electric machine 19, and performing current control on a field winding of the rotor (not illustrated) of the rotary electric machine 19.

Next, an operation waveform of each portion in a low-speed rotation area that is driven by applying one-pulse energization control with an energization angle of 180 degrees to FIG. 5, in which the rotary electric machine 19 is synchronized with an electrical angle cycle of the rotor, will be described with reference to FIG. 6. UH, UL, VH, VL, WH, and WL illustrate ON-OFF logics of the respective power MOSFETs 16a to 16f controlled by the control circuit 13, HIGH illustrating an ON state and LOW illustrating an OFF state. In the ON-OFF switch timing of the power MOSFETs of the same phase (16a and 16b, 16c and 16d, 16e and 16f), time (dead time) for preventing a short circuit of the arms of the same phase by simultaneous ON is ensured. Vbe represents the voltage between the DC terminals B and E of the electric power conversion device 11, Idc represents a current that flows in a high potential side DC line of the electric power conversion unit 12, and Iu, Iv, and Iw represent currents (direction from the electric power conversion device 11 to the rotary electric machine 19 being positive) that flow in the AC terminals U, V, and W of the electric power conversion device 11. Point A is time from the power MOSFET 16a (UH) being ON (zero degree) to being OFF (180 degrees) through 180-degree one-pulse energization control.

In the 180-degree energization control, combination patterns of the power MOSFETs 16a to 16f turned ON in synchronization with the rotation of the rotary electric machine 19 are changed in order for every 60 degrees in electrical angle phase. Then, AC voltage is applied between terminals of the stator windings of the rotary electric machine 19 and the three-phase AC currents Iu, Iv, and Iw flow in the stator windings. Focusing on respective turn-off timings of the power MOSFETs 16a to 16f, one of the power MOSFETs on the high potential side and the low potential side on a side where the two-phase is ON is turned off all the time, and approximately half of the DC current Idc flowing from the battery 17 is interrupted. Accordingly, a counter-electromotive voltage is generated in the wiring inductance 18, and a surge voltage is observed for every 60 degrees in electrical angle phase in the waveform of Vbe. When the power MOSFETs 16a to 16f are turned ON, the current is ON from the source to the drain, that is, in a phase of flowing to parasitic diodes of the power MOSFETs 16a to 16f, and thus no significant change is shown in the Vbe waveform.

Next, an electric power loss (turn-off loss) in a power MOSFET chip that is generated when each of the power MOSFETs 16a to 16f is turned off (for example, point A in FIG. 6) will be described with reference to FIG. 8. FIG. 8 illustrates typical waveforms of a drain-to-source voltage Vds, a drain current Id, and respective branching currents Id1 to Id4 of the power MOSFET chips in parallel connection of the power MOSFET which is turned off in a section in FIG. 6 where each of the power MOSFETs 16a to 16f is turned off. The surge voltage that is generated during the turning off is suppressed by avalanche breakdown of each of the power MOSFETs 16a to 16f. In this case, the current value Id interrupted by each of the respective power MOSFETs 16a to 16f is determined by an internal resistance and a power supply wiring resistance of the battery, an ON resistance of the power MOSFET ON at a preceding timing, a stator winding resistance, and the like. Approximately half of a maximum value of the DC current Idc is interrupted.

Herein, a case where the maximum value of the DC current Idc is 600 A is assumed for interruption of a drain current Id of 300 A. The surge voltage caused by the wiring inductance 18 during the current interruption is suppressed by voltage according to avalanche breakdown characteristics of the power MOSFETs 16a to 16f. Herein, Vav is 25 V. Also, a battery voltage Vb is assumed at 12 V and a power supply wiring inductance Ls is assumed at 5 µH. A turn-off loss Eoff of each of the power MOSFETs during the turning off of the power MOSFETs 16a to 16f is 432 mJ as expressed by the following formula with respect to the turn-off waveform in FIG. 8, and current interruption time Toff, that is, avalanche breakdown time is 115 µs.

$$Eoff = Ls \cdot Id^2/2 \cdot Vav/(Vav-Vb)$$

$$Toff = Id \cdot Ls/(Vav-Vb)$$

In a case where the avalanche breakdown characteristics of the four power MOSFETs in parallel connection in FIG. 7 are complete, Id1 to Id4 are turned off while maintaining a relationship of being one-fourth of Id as illustrated in FIG. 8A, and the turn-off loss of each of the power MOSFETs is equally divided into four to 108 mJ. In a case where those with different avalanche breakdown characteristics are connected in parallel, Id1 to Id4 differ in current distribution according to the characteristic difference. In extreme cases, 100% of the current of Id is concentrated on the single power MOSFET Id1 with the lowest avalanche breakdown voltage as illustrated in FIG. 8B, and the 432 mJ turn-off loss of the power MOSFET may be concentrated on the single power MOSFET.

Next, a value of transitional temperature rise in each of the power MOSFET chips caused by the turn-off loss will be described. At present, products corresponding to the Joint Electron Device Engineering Council (JEDEC) Standard TO263 package are generally used in parallel connection according to a current value thereof in most cases as applications in which a current of at least 100 A flows with a power MOSFET used. However, herein, it is assumed that a product corresponding to the TO263 package on which a power MOSFET with a chip size of 25 mm² is mounted is applied to each of the four-parallel power MOSFETs in FIG. 7. Then, the transient thermal resistance with respect to a loss pulse width 115 µs is approximately 0.033 K/W. The value of the chip temperature rise in the power MOSFET during the interruption of Id: 300 A is simply calculated from these assumptions as follows:

Case where the turn-off loss is uniformly distributed to the four chips in parallel connection: 108 mJ/115 μs×0.033 K/W=31 K Case where the turn-off loss is concentrated on one of the four chips in parallel connection: 432 mJ/115 μs×0.033 K/W=124 K At present, power MOSFETs available as products have a rated temperature of 175° C. inmost cases. Assuming a case where the chip temperature immediately before turn-off is 100° C., a peak temperature of the chip is 131° C. and a sufficient margin is ensured within the rated temperature in a case where the turn-off loss is uniformly distributed to the four chips in parallel connection. However, in a case where the concentration on the single chip occurs, the temperature reaches 224° C. to significantly exceed the rated temperature. As a result, the power MOSFETs may be subjected to overheating destruction.

The chip temperature rise in the current interruption using the avalanche breakdown described above cannot be alleviated, even when the number of the parallel connections increases, when the concentration on the single chip occurs due to the variations of the avalanche breakdown characteristics. Since the variations of the avalanche breakdown characteristics in a power MOSFET manufacturing process do not disappear, it becomes essential to uniformly distribute the loss by matching the characteristics of the power semiconductor switches in parallel connection. In this case, power MOSFET components mounted on the product have to be combined through characteristic screening, and costs are consumed in the product assembly process, which is impractical.

The parallel connections may be conceived to be on the single chip by increasing the chip size of the power MOSFETs. However, a general upper limit size of the power MOSFETs is approximately 50 mm² in view of the cost balance allowing for the chip defect ratio in the semiconductor wafer manufacturing process. This upper limit size is equivalent to the area of the chip size of almost two units mounted on the TO263 package product. However, in a case where a current exceeding 500 A flows as illustrated in FIG. 6, a plurality of the power MOSFETs have to be connected in parallel, and thus the overheating destruction may occur due to the transitional temperature rise caused by the concentration of the turn-off loss on the single chip as described above. Even if the overheating destruction does not occur, the electric power loss in the respective power MOSFET chips in parallel connection is still not uniform, and thus thermal design has to be performed according to the power MOSFET chip with the highest electric power loss. Accordingly, the total area of the power MOSFET chips increases, the heat dissipation circuit of the electric power conversion device becomes larger in size, and product costs increase.

The present invention has been made in order to address the problems described above, and an objective thereof is to provide a vehicular AC electric generator that is provided with an inexpensive, small, and highly reliable electric power conversion unit by decreasing transitional chip temperature rise at current interruption caused by semiconductor switch turn-off.

Solution to Problem

According to an aspect of the present invention, there is provided a vehicular AC electric generator including a rotary electric machine that has a stator and a rotor, an electric power conversion unit that has a three-phase bridge circuit having arms each of which is constituted with semiconductor switches having first main terminals, second main terminals, and control terminals; and a control circuit that controls operations of the semiconductor switches of the three-phase bridge circuit, in which DC power from a DC power supply is converted to AC power by the three-phase bridge circuit that is controlled by the control circuit for electric power to be supplied to the rotary electric machine and the rotary electric machine to be operated as an electric motor, AC power that is generated in the rotary electric machine which is driven is converted into DC power by the three-phase bridge circuit controlled by the control circuit for electric power to be supplied to the DC power supply and the rotary electric machine to be operated as an electric power generator, control is performed by a one-pulse energization method in synchronization with an electrical angle cycle of the rotor when the rotary electric machine is operated as the electric motor, and a surge voltage that is generated when the semiconductor switch is turned off is suppressed by avalanche breakdown, the stator of the rotary electric machine is configured to have a plurality of sets of three-phase windings, and the electric power conversion unit is configured to have a plurality of sets of three-phase bridge circuits and corresponding to the plurality of sets of three-phase windings, each of the three-phase windings of the stator is connected to the DC power supply via the corresponding three-phase bridge circuits of the electric power conversion unit, the plurality of sets of three-phase bridge circuits are controlled to be at different switching timings from each other, and the semiconductor switch constituting each of the arm in the plurality of sets of three-phase bridge circuits is configured to be a one-chip MOSFET.

Advantageous Effects of Invention

According to the vehicular AC electric generator of the present invention, the stator of the rotary electric machine is configured to have a plurality of sets of three-phase windings, the electric power conversion unit is configured to have a plurality of sets of three-phase bridge circuits corresponding to the plurality of sets of three-phase windings, the three-phase windings of the stator are respectively connected to the DC power supply via the corresponding three-phase bridge circuits of the electric power conversion unit, the plurality of sets of three-phase bridge circuits are controlled at different switching timings from each other, and the semiconductor switches constituting the respective arms in the plurality of sets of three-phase bridge circuits are configured to be one-chip MOSFTEs. Accordingly, the transitional chip temperature rise at the current interruption caused by semiconductor switching turn-off can be decreased, and the vehicular AC electric generator can be provided with the inexpensive, small, and highly reliable electric power conversion unit. The objectives, characteristics, viewpoints, and effects of the present invention other than the above will be made apparent in detail in the following detailed description of the present invention based on the accompanying drawings.

DESCRIPTION OF EMBODIMENTS

First Embodiment

Figure 1:
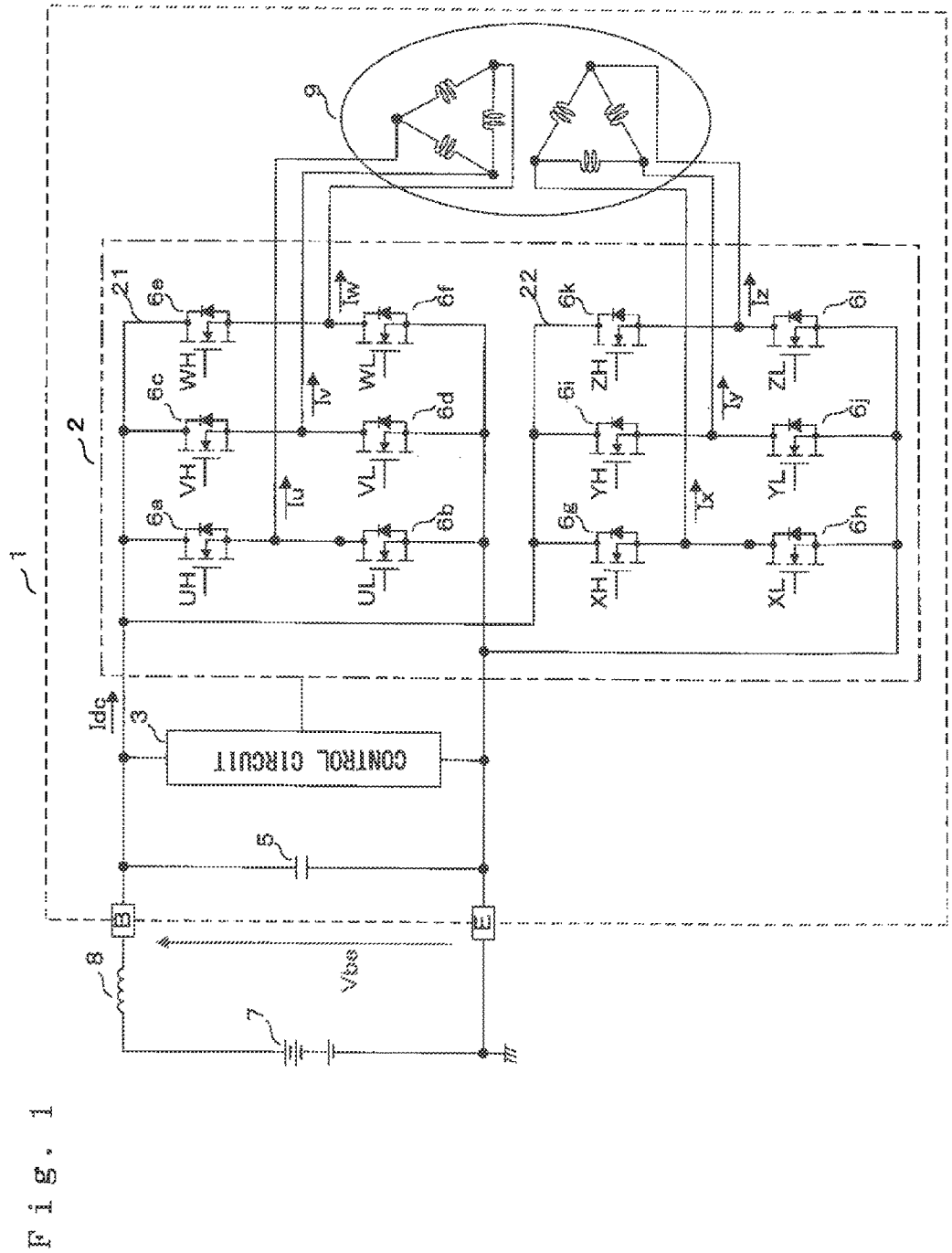
FIG. 1 is a configuration diagram illustrating a vehicular AC electric generator according to a first embodiment of the present invention.

An embodiment of the present invention will be described with reference to accompanying drawings. FIG. 1 is a configuration diagram illustrating a vehicular AC electric generator according to the first embodiment of the present invention. In a system that is illustrated in FIG. 1, DC power of a battery 7 is converted to two sets of three-phase AC power by an electric power conversion unit 2 so that a rotary electric machine 9 (operated as an electric motor) is driven and a rotational force is given to an engine (not illustrated) or three-phase AC power that is generated by the rotary electric machine 9 (operated as an electric power generator) which is driven by rotation of the engine (not illustrated) is converted to DC power by the electric power conversion unit 2 to be supplied to the battery 7 and a vehicle load (not illustrated). The rotary electric machine 9 has a stator and a rotor.

The rotary electric machine 9, the electric power conversion unit 2, a control circuit 3, and a capacitor 5 form an integral structure in an AC electric generator 1. A positive terminal of the battery 7 is connected to a high potential side DC terminal B of the AC electric generator 1, and a negative terminal of the battery 7 is connected to a low potential side DC terminal E of the AC electric generator 1. In the first embodiment, two sets of Δconnection three-phase windings are arranged as stator windings of the rotary electric machine 9. The UVW side stator winding and the XYZ side stator winding are installed in the stator to have a positional relationship with a phase difference of approximately 30 degrees in electrical angle from each other. The U-phase, V-phase, and W-phase stator windings (first set of three-phase windings) of the rotary electric machine 9 are connected to the three-phase AC terminals, U, V, and W of a (first) three-phase bridge circuit 21 of the electric power conversion unit 2. The X-phase, Y-phase, and Z-phase stator windings (second set of three-phase windings) of the rotary electric machine 9 are connected to the three-phase AC terminals X, Y, and Z of a (second) three-phase bridge circuit 22 of the electric power conversion unit 2. The three-phase AC terminals U, V, W, X, Y, and Z of the electric power conversion unit 2 are internal terminals of the AC electric generator 1, and a power harness as vehicle wiring is not present in connection between the electric power conversion unit 2 and the rotary electric machine 9. A wiring inductance 8 represents the sum of parasitic inductance of high potential side and low potential side wiring connecting the battery 7 to the electric power conversion unit 2.

Figure 3:
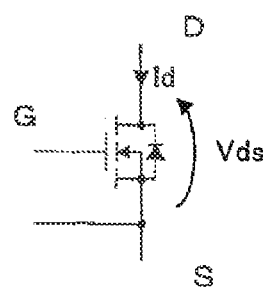
FIG. 3 is a diagram illustrating an internal configuration of a power semiconductor switch that is used in the present invention.

The electric power conversion unit 2 uses N channel-type power MOSFETs (6a to 6f and 6g to 6l) as semiconductor switches for respective arms, and is configured to have two sets of two-series and three-parallel, so-called three-phase bridge circuits. Both ends of the two series are connected to the DC terminals B and E of the electric power conversion unit 2 and a middle point of the two series is connected to the AC terminals U, V, W, and X, Y, Z of the electric power conversion unit 2. As illustrated in FIG. 3, the power MOSFETs 6a to 6l (semiconductor switches for the respective arms) are configured to be one chip without parallel connection with a chip size corresponding to a value of a current flowing in the stator of the rotary electric machine 9, have a first main terminal (drain D), a second main terminal (source S), and a control terminal (gate G), are turned ON or OFF when voltage between the gate and the source is controlled by the control circuit 3, are resistance elements allowing bidirectional energization between the drain and the source when ON, and are diode elements allowing only energization from the source to the drain when OFF. In the first embodiment, a general upper limit size of the power MOSFET is approximately 50 mm$^2$ in view of cost balance allowing for a chip defect ratio in a semiconductor wafer manufacturing process.

The small-capacity capacitor 5 is connected to the DC terminals B and E of the AC electric generator 1 so that a high-frequency noise attributable to switching of the power MOSFETs 6a to 6l and the like is reduced and a radiation noise such as a radio noise and a conduction noise are suppressed. In general, a large-capacity capacitor is connected to a position of the capacitor 5 so as to smooth voltage between the DC terminals B and E in a case where the electric power conversion unit 2 performs electric power conversion in pulse width modulation (PWM) control. However, in the embodiment of the present invention, the electric power conversion is performed by a one-pulse energization method (described later), and thus a large-capacity smoothing capacitor is not essential and is not mounted in the interest of product size reduction and cost reduction.

The control circuit 3 controls an output torque as the electric motor and an electric power generation amount as the electric power generator by performing ON-OFF driving of the power MOSFETs 6a to 6l of the electric power conversion unit 2 according to an operation mode, based on various types of sensor information such as a command from a higher ECU (not illustrated), the voltage between the B and E terminals, and a field winding current or a rotation position of the rotor (not illustrated) of the rotary electric machine 9, and performing current control on a field winding of the rotor (not illustrated) of the rotary electric machine 9.

Figure 2:
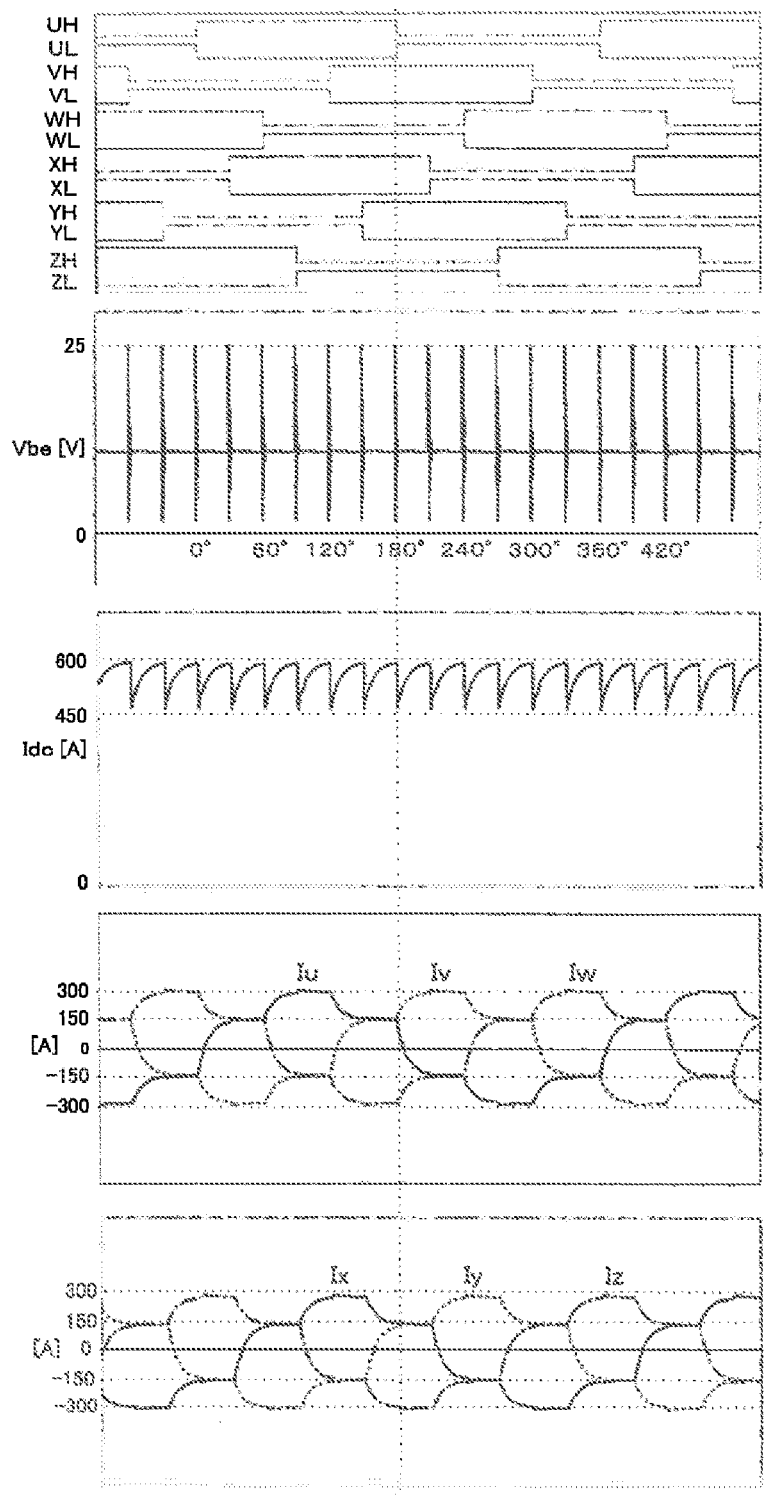
FIG. 2 is a diagram illustrating an operation waveform of each portion in FIG. 1 in a case where a rotary electric machine is driven through 180-degree energization control.

Next, an operation waveform of each portion in a low-speed rotation area that is driven by applying one-pulse energization control (one-pulse energization method) with an energization angle of 180 degrees to FIG. 1, in which the rotary electric machine 9 is synchronized with an electrical angle cycle of the rotor, will be described with reference to FIG. 2. UH, UL, VH, VL, WH, WL, XH, XL, YH, YL, ZH, and ZL illustrate ON-OFF logics of the respective power MOSFETs 6a to 6l controlled by the control circuit 3, HIGH illustrating an ON state and LOW illustrating an OFF state. As described above, the stator windings on the XYZ side are arranged to have a relationship with a phase delay of approximately 30 degrees in electrical angle with respect to the stator windings on the UVW side. As a result, ON-OFF switch timing of XH, XL, YH, YL, ZH, and ZL has a relationship with a phase delay of approximately 30 degrees in electrical angle with respect to UH, UL, VH, VL, WH, and WL, respectively. In the ON-OFF switch timing of the power MOSFETs of the same phase (6a and 6b, 6c and 6d, 6e and 6f, 6g and 6h, 6i and 6j, 6k and 6l), time (dead time) for preventing a short circuit of the arms of the same phase by simultaneous ON is ensured.

6a and 6b are U-phase upper and lower arms, 6c and 6d are V-phase upper and lower arms, and 6e and 6f are W-phase upper and lower arms. Likewise, 6g and 6h are X-phase upper and lower arms, 6i and 6j are Y-phase upper and lower arms, and 6k and 6l are Z-phase upper and lower arms. Vbe represents the voltage between the DC terminals B and E of the electric power conversion unit 2, Idc represents a DC current that flows in a high potential side DC line of the electric power conversion unit 2, and Iu, Iv, Iw, Ix, Iy, and Iz represent currents (direction from the electric power conversion unit 2 to the rotary electric machine 9 being positive) that flow in the AC terminals U, V, W, X, Y, and Z of the electric power conversion unit 2. Point A is time from the power MOSFET 6a (UH) being ON (zero degree) to being OFF (180 degrees) through 180-degree one-pulse energization control.

In the 180-degree energization control, combination patterns of the power MOSFETs 6a to 6l turned ON in synchronization with the rotation of the rotary electric machine 9 are changed in order for every 60 degrees in electrical angle phase on the UVW side and the XYZ side, respectively. Then, AC voltage is applied between terminals of the stator windings of the rotary electric machine 9 and the three-phase AC currents Iu, Iv, Iw, Ix, Iy, and Iz flow in the stator windings. Ix, Iy, and Iz have a relationship of delay by approximately 30 degrees in electrical angle phase with respect to Iu, Iv, and Iw, respectively.

Focusing on respective turn-off timings of the power MOSFETs 6a to 6l, one of the power MOSFETs on the high potential side and the low potential side on a side where the two-phase is ON is turned off all the time on each of the UVW side and the XYZ side, and approximately one-fourth of the DC current Idc flowing from the battery 7 is interrupted. Accordingly, a counterelectromotive voltage is generated in the wiring inductance 8, and a surge voltage is observed for every 30 degrees in electrical angle phase in the waveform of Vbe. When the power MOSFETs 6a to 6l are turned ON, the current is ON from the source to the drain, that is, in a phase of flowing to parasitic diodes of the power MOSFETs 6a to 6l, and thus no significant change is shown in the Vbe waveform.

Figure 4:
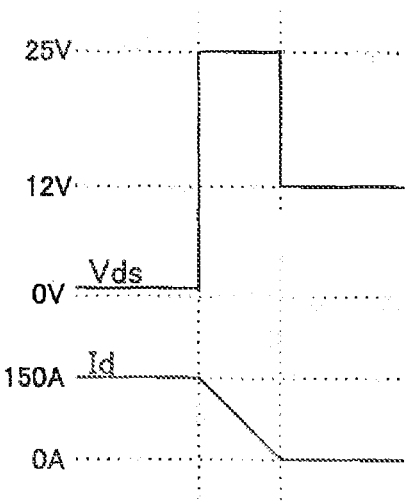
FIG. 4 is a diagram illustrating a voltage-current waveform at current interruption according to the configuration in FIG. 3.

Next, an electric power loss (turn-off loss) in a power MOSFET chip that is generated when each of the power MOSFETs 6a to 6l is turned off (for example, point A in FIG. 2) will be described with reference to FIG. 4. FIG. 4 illustrates typical waveforms of a drain-to-source voltage Vds and a drain current Id of the power MOSFET which is turned off in a section in FIG. 2 where each of the power MOSFETs 6a to 6l is turned off. The surge voltage that is generated during the turning off is suppressed by avalanche breakdown of each of the power MOSFETs 6a to 6l. In this case, the current value Id interrupted by each of the respective power MOSFETs 6a to 6l is determined by an internal resistance and a power supply wiring resistance of the battery, an ON resistance of the power MOSFET ON at a preceding timing, a stator winding resistance, and the like. Approximately one-fourth of a maximum value of the DC current Idc is interrupted.

Herein, a case where the maximum value of the DC current Idc is 600 A is assumed for interruption of a drain current Id of 150 A. The surge voltage caused by the wiring inductance 8 during the current interruption is suppressed by voltage according to avalanche breakdown characteristics of the power MOSFETs 6a to 6l. Herein, Vav is 25 V. Also, a battery voltage Vb is assumed at 12 V and a power supply wiring inductance Ls is assumed at 5 µH. A turn-off loss Eoff of each of the power MOSFETs during the turning off of the power MOSFETs 6a to 6f is 108 mJ as expressed by the following formula with respect to the turn-off waveform in FIG. 4, and current interruption time Toff, that is, avalanche breakdown time is 58 µs. The same assumptions as the assumptions in the description of the problem of the related art are used for comparison with the related art.

$$Eoff=Ls \cdot Id^2/2 \cdot Vav/(Vav-Vb)$$

$$Toff=Id \cdot Ls/(Vav-Vb)$$

Next, a value of transitional temperature rise in the power MOSFETs 6a to 6l caused by the turn-off loss will be described. When it is assumed that the one-chip power MOSFET in FIG. 3 has a chip size of 40 mm², which is equivalent to 160% of the chip size at 25 mm² that is applied in the description of the problem of the related art, and is mounted on a package having the same heat dissipation structure as a TO263 package, a transient thermal resistance with respect to a loss pulse width of 58 µs is approximately 0.01 k/W. The value of the chip temperature rise in the power MOSFET during the interruption of Id: 150 A is simply calculated from these assumptions as follows:

$$108 \text{ mJ}/58 \text{ µs} \times 0.01 \text{ K/W}=19 \text{ K}$$

At present, power MOSFETs available as products have a rated temperature of 175° C. in most cases. However, assuming a case where the chip temperature immediately before turn-off is 100° C., a peak temperature of the chip is 119° C. and overheating destruction does not occur because of a sufficient margin within the rated temperature. Comparing the value of the transitional chip temperature rise in the section where the semiconductor switch of each arm is turned off with the related art, 300 A is interrupted by the semiconductor switches of the respective arms four-parallel with a chip size of 25 mm² in the related art whereas 150 A is interrupted by the semiconductor switches of the respective arms with a chip size of 40 mm² and a one-chip configuration in the first embodiment, and the first embodiment is 25% higher in interruption current per unit area of the chip, that is, current density (total chip area of the semiconductor switches in a product decreases by 20%). Nevertheless, the chip temperature rise value is Δ19 K, which is lower than the Δ124 K in a case where the turn-off loss is concentrated on one of the four-parallel chip of the related art and is reversely reduced by approximately 40% compared to the Δ31 K in a case where the turn-off loss is equally distributed in the four-parallel chip.

Figure 5:
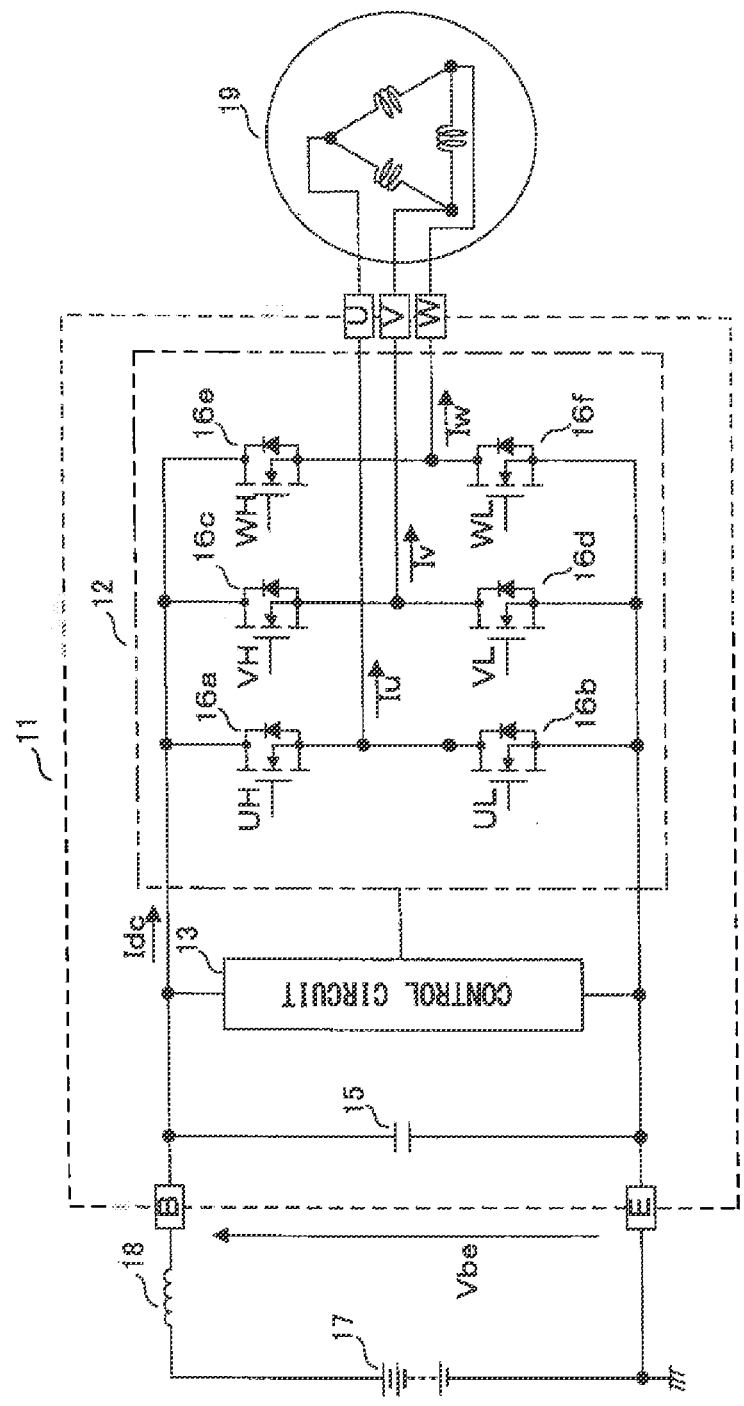
FIG. 5 is a configuration diagram illustrating a vehicular AC electric generator of the related art that uses a rotary electric machine and an electric power conversion unit.
Figure 6:
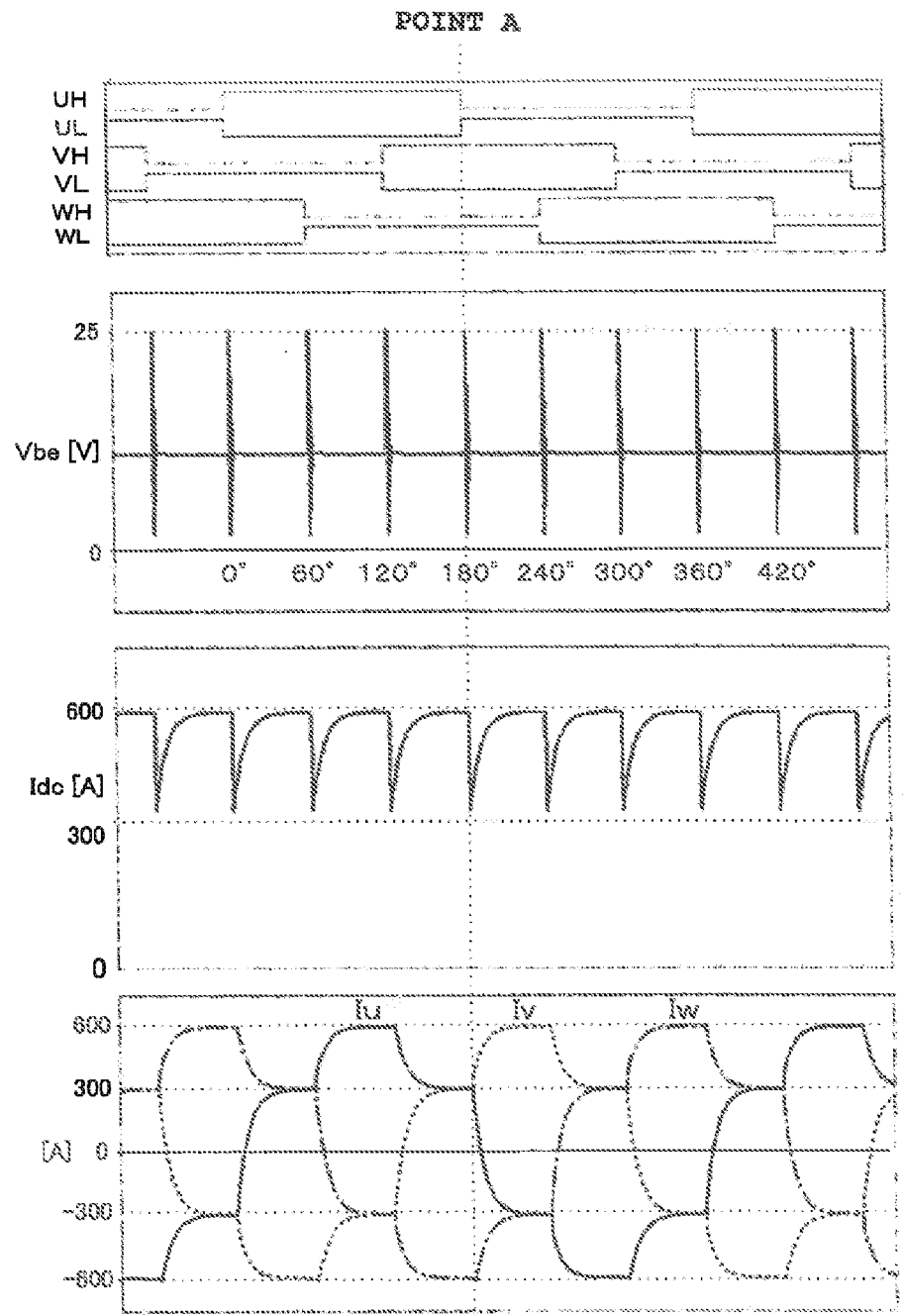
FIG. 6 is a diagram illustrating an operation waveform of each portion in FIG. 5 in a case where the rotary electric machine is driven through 180-degree energization control.
Figure 7:
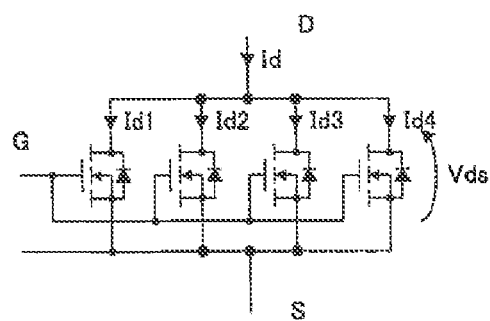
FIG. 7 is a diagram illustrating an internal configuration of a power MOSFET of the related art.
Figure 8A:
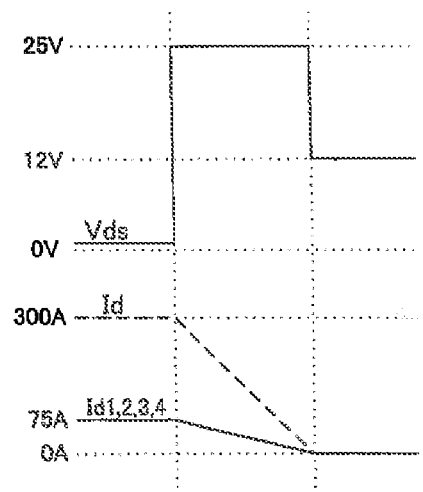
FIG. 8A and FIG. 8B are diagrams illustrating a voltage-current waveform at current interruption according to the configuration in FIG. 7.
Figure 8B:
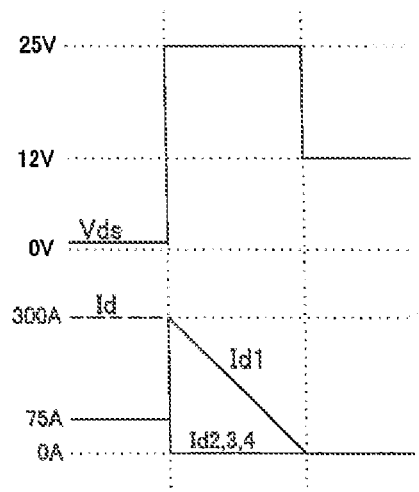

This causes the current value that is interrupted when the respective power MOSFETs 6a to 6l are turned off to be half of the current value that is interrupted when the respective power MOSFETs 16a to 16f in FIG. 5 are turned off, the current interruption time during the turning off to be halved, and the transient thermal resistance of the chip of each of the power MOSFETs 6a to 6l to decrease as a result with the stator of the rotary electric machine 9 being configured to have the two sets of three-phase windings and the electric power conversion unit 2 being configured to have the two three-phase bridge circuits corresponding to the two sets of three-phase windings as illustrated in FIG. 1.

Comparing the sum of the turn-off loss that is generated in the power semiconductor switches of the entire product with the related art, each turn-off loss decreases to one-fourth of the turn-off loss of each of the power MOSFETs 16a to 16f in FIG. 5 since the current value that is interrupted when the respective power MOSFETs 6a to 6l in FIG. 1 are turned off is halved. Also, the number of current interruptions for each electrical angle cycle doubles. As a result, the sum of the turn-off loss in the electric power conversion unit 2 is half of that of the related art.

In the AC electric generator, the stator of the rotary electric machine 9 is configured to have a plurality of sets (for example, two sets) of three-phase windings, the electric power conversion unit 2 is configured to have the same plural sets of three-phase bridge circuits corresponding to the plurality of sets of three-phase windings, the plurality of sets of three-phase bridge circuits are controlled to be at different switching timings, and the semiconductor switches that constitute the respective arms in the respective one of the plurality of sets of three-phase bridge circuits are configured to be the one-chip power MOSFET without parallel connection as described above. Accordingly, overheating destruction of the power MOSFET attributable to switching loss concentration in each of the arms can be prevented. In addition, since the value of the interruption current by the turning off of the respective arms is decreased to reduce the turn-off loss and the value of the transitional chip temperature rise in the turn-off section and the average chip electric power loss are suppressed as described above, the overheating destruction of the power MOSFET can be further reliably prevented and product reliability can be improved. Also, the margin to the rated temperature allows the chip of the power MOSFET or a heat dissipation circuit to be reduced in size for product size reduction and cost reduction.

In addition to the effects described above, power supply line and stator winding current fluctuations can be reduced according to the first embodiment since the stator winding is installed as the two sets of three-phase windings with a positional relationship having a phase difference of approximately 30 degrees in electrical angle from each other and the power semiconductor switch of the two sets of three-phase bridge circuits corresponding thereto is controlled according to the stator winding electrical phase difference. As a result, effects such as reduction of a drive torque ripple as the electric motor, reduction of a power generation current ripple as the electric power generator, reduction of an electromagnetic sound generated from the rotary electric machine, reduction of radiation-conduction noise (EMI), and the like can be also anticipated.

Since the chip size of the one-chip power MOSFET that constitutes the respective arms of the two sets of three-phase bridge circuits is 50 mm$^2$ or less, a chip defect ratio can be lowered in a semiconductor wafer manufacturing process and a highly reliable product can be provided at a low cost. The first embodiment may also be applied to a product in which the maximum value of the DC current during the operation of the rotary electric machine as the electric motor is 100% to 200% (400 A to 800 A in a case where the allowable current is 400 A) of the current allowed by the power MOSFET chip with a chip size of 50 mm$^2$. This is because one chip with a chip size of 50 mm$^2$ or less can constitute the power MOSFET of each arm, even when the vehicular AC electric generator is configured to have one set of three-phase stator winding and three-phase bridge circuit, in a case where the maximum value is less than 100% and the power MOSFET of each arm has to have at least two chips with a chip size of 50 mm$^2$ or less each, and a chip size of 50 mm$^2$ or more in a case where one chip is used, even when the vehicular AC electric generator is configured to have two sets of three-phase stator windings and three-phase bridge circuit, in a case where the maximum value is 200% or higher.

When the stator winding is two sets of three-phase windings, six power harnesses of U, V, W, X, Y, and Z phases are required as vehicle wiring in a case where the rotary electric machine and the electric power conversion unit are separate structures. However, in the first embodiment, the rotary electric machine, the electric power conversion unit, and the control circuit form an integral structure, and thus the power harness can be reduced for vehicle weight reduction and cost reduction.

The embodiment can be appropriately modified or omitted in the scope of the present invention. For example, the stator of the rotary electric machine 9 is configured to have the two sets of three-phase windings and the electric power conversion unit 2 is configured to have the two sets of three-phase bridge circuits corresponding to the two sets of three-phase windings in the first embodiment, but the stator of the rotary electric machine 9 may be configured to have three sets of three-phase windings, the electric power conversion unit 2 may be configured to have three three-phase bridge circuits corresponding to the three sets of three-phase windings, and the three three-phase bridge circuits may be controlled to be apart by approximately 20 degrees in the order of electrical phase of switching timing. Also, the stator of the rotary electric machine 9 may be configured to have a plurality of sets of three-phase windings and the electric power conversion unit 2 may be configured to have the same plural sets of three-phase bridge circuits corresponding to the plurality of sets of three-phase windings. The stator winding of the rotary electric machine 9 may be a Y connection according to desired characteristics not limited to the Δconnection. The energization angle of the one-pulse energization control is not limited to 180 degrees, and the energization angle may be fixed to 120 degrees or the like in a case where a more-than-required torque is generated or a more-than-required current flows. The rotary electric machine 9 and the electric power conversion unit 2 form an integral structure in the AC electric generator 1, but the rotary electric machine 9 and the electric power conversion unit 2 may be separate structures. In this case, the effects that are obtained by the integral structure are not obtained, but the integral structure is not essential.

The invention claimed is:
1. A vehicular AC electric generator comprising:
a rotary electric machine that has a stator and a rotor;
an electric power converter that has a three-phase bridge circuit having arms each of which is constituted with semiconductor switches having first main terminals, second main terminals, and control terminals; and
a control circuit that controls operations of the semiconductor switches of the three-phase bridge circuit,
wherein DC power from a DC power supply is converted to AC power by the three-phase bridge circuit that is controlled by the control circuit for electric power to be supplied to the rotary electric machine and the rotary electric machine to be operated as an electric motor,
AC power that is generated in the rotary electric machine which is driven is converted into DC power by the three-phase bridge circuit controlled by the control circuit for electric power to be supplied to the DC power supply and the rotary electric machine to be operated as an electric power generator, control is performed by one-pulse energization control with an energization angle in synchronization with an electrical angle cycle of the rotor when the rotary electric machine is operated as the electric motor, the stator of the rotary electric machine includes a plurality of sets of three-phase windings, and the electric power converter includes a plurality of sets of three-phase bridge circuits corresponding to the plurality of sets of three-phase windings, each of the three-phase windings of the stator is connected to the DC power supply via the corresponding three-phase bridge circuits of the electric power converter, the plurality of sets of three-phase bridge circuits are controlled to be at different switching timings from each other, a surge voltage that is generated when the semiconductor switch is turned off is suppressed by avalanche breakdown, the semiconductor switch constituting each of the arms in the plurality of sets of three-phase bridge circuits is configured to be a one-chip MOSFET without a parallel connection to another MOSFET chip, to avoid an unequal distribution of turn-off loss, and the stator of the rotary electric machine is configured to have two sets of three-phase windings that are installed with a positional relationship having a phase difference of approximately 30 degrees in electrical angle from each other, and the electric power converter is configured to have the two sets of three-phase bridge circuits corresponding to the two sets of three-phase windings.

2. The vehicular AC electric generator according to claim 1, wherein the two sets of three-phase bridge circuits are controlled to be different by approximately 30 degrees in switching timing from each other according to the electrical phase difference between the two sets of stator windings.

3. The vehicular AC electric generator according to claim 2, wherein the semiconductor switch that constitutes each of the arms in the two sets of three-phase bridge circuits is configured to be a one-chip MOSFET with a chip size of 50 mm$^2$ or less.

4. The vehicular AC electric generator according to claim 1, wherein the rotary electric machine, the electric power converter, and the control circuit form an integral structure.

5. The vehicular AC electric generator according to claim 2, wherein the rotary electric machine, the electric power converter, and the control circuit form an integral structure.

* * * * *